United States Patent [19]

Huff et al.

[11] Patent Number: 5,447,118

[45] Date of Patent: Sep. 5, 1995

[54] WATER BOTTLE ASSEMBLY HAVING GNAW PROTECTION SHIELD

[75] Inventors: Marvin E. Huff, Union City; Robert R. Rofen, Hayward, both of Calif.

[73] Assignee: Novalek, Inc., Hayward, Calif.

[21] Appl. No.: 226,314

[22] Filed: Apr. 12, 1994

[51] Int. Cl.[6] .................... A01K 7/06; A01K 39/02
[52] U.S. Cl. ..................... 119/18; 119/72.5; 211/73
[58] Field of Search .......... 119/18, 72.5, 72; 248/102, 103; 211/70.1, 72, 73, 75

[56] References Cited

U.S. PATENT DOCUMENTS

| | | | |
|---|---|---|---|
| 2,514,491 | 7/1950 | Hay et al. | 119/18 |
| 3,251,342 | 5/1966 | Kay | 119/18 |
| 3,529,575 | 9/1970 | Schalk . | |
| 3,589,338 | 6/1971 | Lovitz . | |
| 3,645,234 | 2/1972 | Schroer | 119/18 |
| 3,776,195 | 12/1973 | Willinger . | |
| 4,022,159 | 5/1977 | Salva | 119/72.5 |
| 4,787,337 | 11/1988 | Mayer . | |
| 4,794,880 | 1/1989 | Atchley . | |
| 4,807,567 | 2/1989 | Atchley . | |
| 5,301,634 | 4/1994 | Ho | 119/18 |

FOREIGN PATENT DOCUMENTS 1133940 7/1962 Germany ............... 119/18

Primary Examiner—Todd E. Manahan
Attorney, Agent, or Firm—Harris Zimmerman

[57] ABSTRACT

A shield or guard for preventing damage to an animal watering bottle by an animal within a cage comprises a generally planar web of metal or similarly hard material having length and width dimensions similar to the water bottle assembly being protected. A pair of tabs are formed at the upper edge of the web, and are angled downwardly to engage a lateral wire of the animal cage wall. A tube opening is provided in the web adjacent to the lower end thereof to permit the water delivery tube to extend from the bottle through the shield and through the cage wall. The water bottle is disposed to impinge on the outer surface of the web, with the delivery tube extending through the tube opening, and a wire bail is secured about the bottle and hooked to a lateral wire of the cage wall to support the bottle on the cage. To remove and service the water bottle, there is no need to remove the shield; rather, the wire bail is unhooked from the cage wall, and the bottle is removed by withdrawing the delivery tube from the tube opening in the shield. The bottle is replaced by inserting the delivery tube through the tube opening in the shield, abutting the bottle against the shield, and re-joining the bail about the bottle to the cage wall. The web of the shield blocks access by the animal to the soft plastic of the water bottle, and prevents damage to the bottle due to gnawing and chewing by the animal.

2 Claims, 2 Drawing Sheets

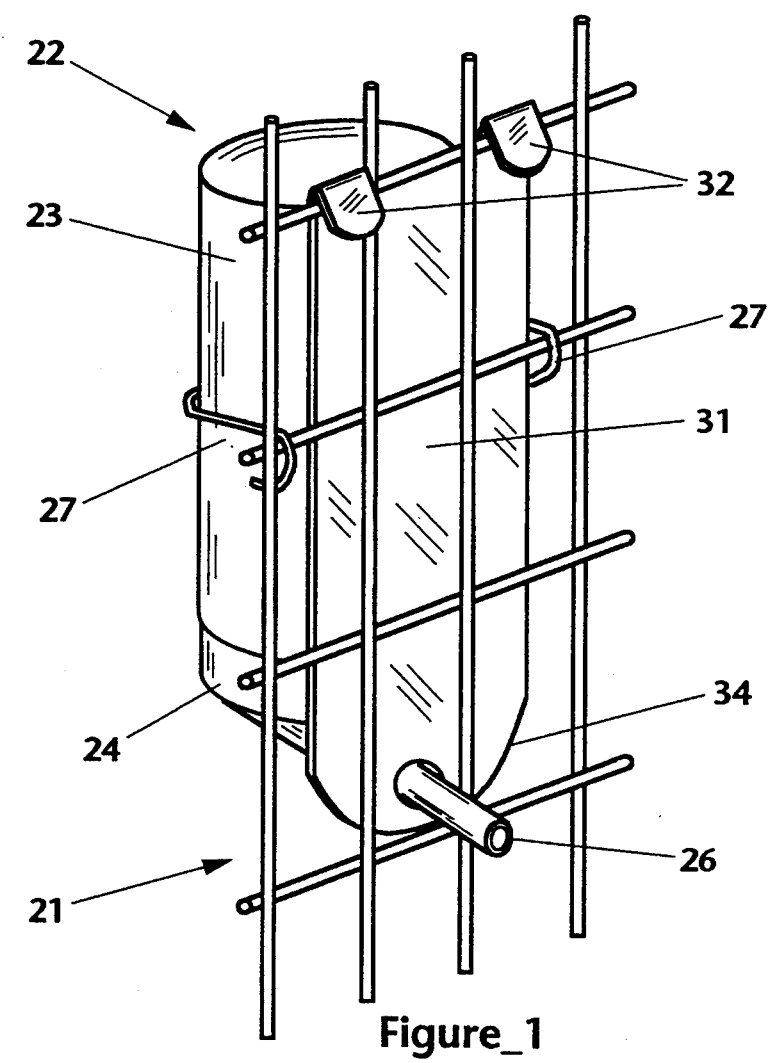
Figure_1
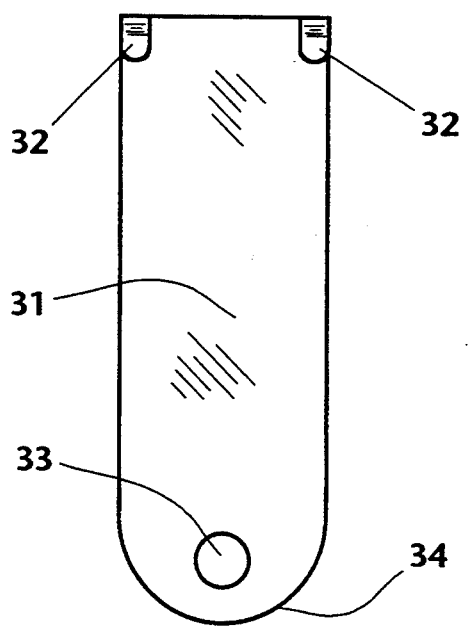
Figure_2

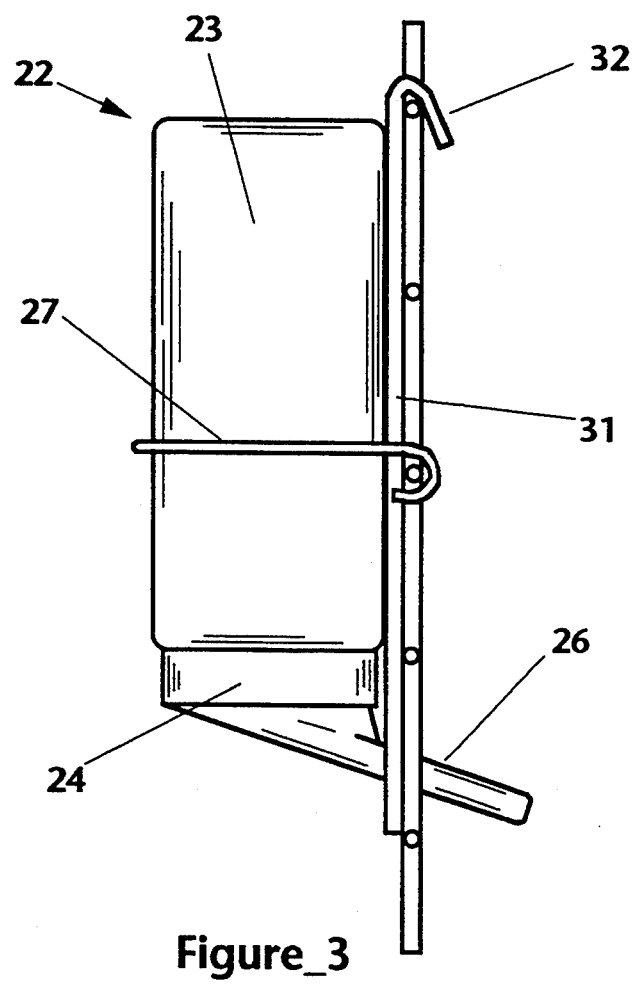
Figure_3
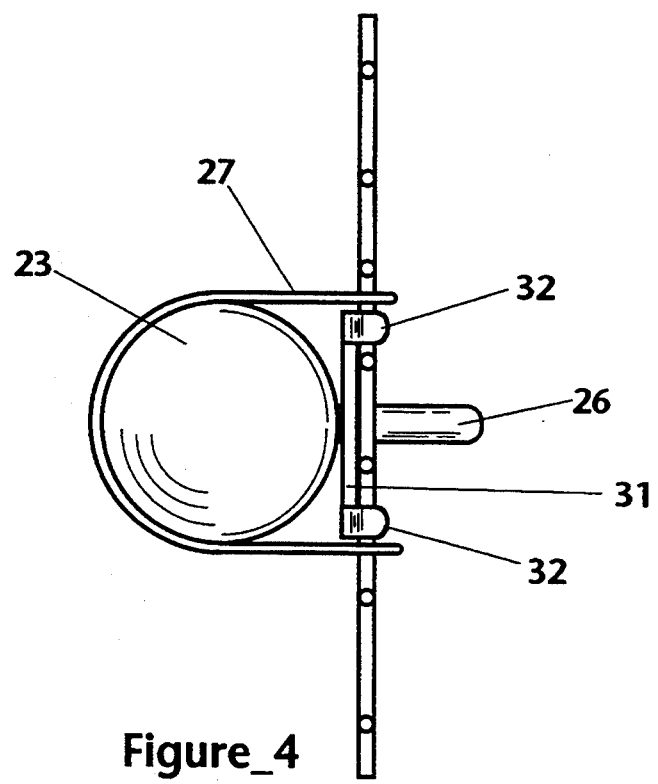
Figure_4

WATER BOTTLE ASSEMBLY HAVING GNAW PROTECTION SHIELD

BACKGROUND OF THE INVENTION

The present invention relates to a device for supplying water to pets, and more particularly to a shield for protecting a watering device from the animal that it serves.

Animals that are kept in cages, such as pets or laboratory animals, are sustained by food and water provided in containers that are typically secured to the cage wall. In recent years animal watering devices have been adopted that include an inverted bottle having a delivery tube and a valve to permit water delivery upon demand by the animal. Furthermore, glass bottles have been replaced by less expensive, non-breakable plastic bottles and containers. Animal cages usually comprise wire enclosures, and such assemblies are generally secured to the cage wall by simple wire fasteners or bails. These devices permit the animal to receive water whenever required, and are easily serviced, cleaned, and refilled.

It has been observed that caged small animals, such as rats, hamsters, gerbils, or rabbits, for example, tend to exhibit typical rodent behavior and gnaw and chew on whatever objects are accessible. Larger caged animals will also gnaw and chew on available objects due to lack of exercise and boredom. Plastic water bottles are susceptible to damage from chewing and gnawing, because of the softness of the material. Such damage can be significant in large laboratory installations. Water bottles formed of glass or metal are gnaw resistant, but are expensive because of the cost of materials and fabrication and/or the need for careful handling to avoid breakage.

One solution to this problem is to provide a metal shield or guard in conjunction with a water bottle formed of soft, inexpensive plastic or the like. The guard is interposed between the bottle and the animal to block access to the bottle and prevent damage to the bottle due to gnawing. For example, U.S. Pat. No. 4,787,337 describes a water bottle guard comprised of a rectangular metal enclosure that surrounds the bottle on all sides, and provides a bottom opening from which the water delivery tube extends toward the cage wall. In this construction the guard also supports the bottle, and the guard must be assembled to the bottle as the bottle is hung from the wire cage wall. Consequently, the guard must be removed from the cage wall in order to remove, clean, service, and refill the bottle. There is extra labor and time involved in the assembly and disassembly of the bottle and guard, which can become a significant cost factor in large laboratory installations.

Another solution to the gnawing problem, disclosed in U.S. Pat. No. 4,794,880, generally involves suspending the bottle within the cage in pendulum fashion, so that the animal cannot apply sufficient lateral force to the bottle to successfully bite tile smooth contours of tile bottle. However, the suspended bottle must be hung within the cage from the upper wall, thus requiring that the cage be opened to service and refill the bottle. Whenever an animal cage is opened, there is the potential for escape or injury to the animal.

Thus the prior art lacks a cost-effective solution to the problem of providing water to a caged animal while preventing damage to the watering device by animal biting and gnawing.

SUMMARY OF THE PRESENT INVENTION

The present invention generally comprises a shield or guard for preventing damage to an animal watering bottle by an animal within a cage. A salient feature of the shield is that it is secured to the cage wall and is not directly assembled to the water bottle, so that removal, servicing, and replacement of the water bottle is not complicated by the use of the shield. Furthermore, the shield is inexpensive to manufacture and simple to install, and extremely effective and stopping water bottle damage due to animal gnawing and chewing.

The shield of the invention comprises a generally planar web of metal or similarly hard material having length and width dimensions similar to the water bottle being protected. A pair of tabs are formed at the upper edge of the web, and are angled downwardly to engage a lateral wire of the animal cage wall. An tube opening is provided in the web adjacent to the lower end thereof to permit the water delivery tube to extend from the bottle through the shield and through the cage wall. The water bottle is disposed to impinge on the outer surface of the web, with the delivery tube extending through the tube opening, and a wire bail is secured about the bottle and hooked to a lateral wire of the cage wall to support the bottle on the cage.

To remove and service the water bottle, there is no need to remove the shield of the invention. Rather, the wire bail is unhooked from the cage wall, and the bottle is removed by withdrawing the delivery tube from the tube opening in the shield. The bottle is replaced by inserting the delivery tube through the tube opening in the shield, abutting the bottle against the shield, and re-joining the bail about the bottle to the cage wall. No additional time or labor is required to service the bottle by the presence and use of the shield of the invention. The web of the shield blocks access by the animal to the soft plastic of the water bottle, and prevents damage to the bottle due to gnawing and chewing by the animal.

The shield may easily be removed from the cage wall whenever desired, and cleaned, reinstalled or repositioned as desired. Thus the shield of the invention provides optimal protection for the water bottle without any increase in maintenance time or cost.

BRIEF DESCRIPTION OF THE DRAWING

FIG. 1 is a perspective view of the animal water bottle shield of the present invention, shown in use in a typical cage installation.

FIG. 2 is a plan view of the animal water bottle shield of the invention.

FIG. 3 is a side elevation of the animal water bottle shield of the present invention, shown in use in a typical cage installation.

FIG. 4 is a top view of the animal water bottle shield as used in FIG. 3.

DESCRIPTION OF THE PREFERRED EMBODIMENT

The present invention generally comprises a guard or shield for preventing damage to a cage-mounted animal watering bottle by an animal within the cage. With regard to FIGS. 1, 3, and 4, a typical animal cage includes at least one wall portion 21 formed of lateral and vertical wires joined in an orthogonal matrix to retain the animal while providing air circulation, light, and visual stimuli. A typical water bottle assembly 22 known in the prior art includes a water bottle 23 mounted externally to the wall portion 21. The bottle 23 is formed of flexible, inexpensive plastic or the like, and a screw cap 24 is removably secured to the open end of the bottle. A water delivery tube 26 extends obliquely from the cap 24 through the cage wall 21 to serve the animal, and a semicircular wire bail 27 is provided with hook ends that engage a lateral wire of the cage wall portion 21 to secure the bottle to the cage. The tube 26 bearing on one of the lateral wires provides vertical support for the bottle 23, and the wire bail 27 provides lateral support. The bottle is held in the inverted position during use, as shown, so that water is fed gravitally from the bottle to the delivery tube 26. A valve is disposed in the output end of the tube 26, so that water is dispensed only when the animal licks or sucks on the output end. Thus water is available continuously and delivered on demand to the animal within the cage.

With regard to the Figures, and FIG. 2 in particular, the shield 3 1 of the invention includes a generally planar web of sheet metal or similarly hard material formed in an elongated configuration having length and width dimensions approximately the same as the water bottle assembly. A pair of tabs 32 are formed integrally at the upper edge of the shield 31, and folded down at an acute angle in hook-like fashion. Disposed in a lower portion of the shield is a tube hole 33. The lower edge 34 of the shield is smoothly contoured to eliminate sharp corners that could injure the animal within the cage. The shield 31 is arranged so that the tabs 32 are hooked over one of the lateral wires of the wall portion 21 to suspend and support the shield on the wall. This is the sole means of support required by the shield 31.

The water bottle 23 is disposed to impinge on the external surface of the shield 31, with the delivery tube 26 extending through the hole 33 and through the wire wall portion 21 to the animal within the cage. The wire bail 27 extends about the outer surface of the bottle 23 and is hooked to one of the lateral wires of the cage wall to join the bottle 23 to the cage. It may be appreciated that the delivery tube 26 may rest upon the edge of the hole 33, thus supporting the bottle 23 in the vertical direction, while the bail 27 provides lateral support.

The shield 31 is sufficiently long and wide to prevent the animal within the cage from biting or gnawing the bottle 23 or the cap 24. (The delivery tube 26 is formed of tubular metal that is inherently strong enough to resist biting by the animal, and generally does not require protection.) The shield 31 does not interfere in any way with the support or function of the bail 27, so that use and replacement of the bottle 23 is not complicated by the presence of the shield. For example, the bottle may be removed by unfastening the bail from the lateral wire of the cage, and withdrawing the delivery tube from the tube hole 33 of the shield. The bottle is replaced by first inserting the delivery tube 26 through the hole 33, and then re-fastening the wire bail 27 to a lateral wire of the cage wall. There is nothing critical in the vertical spacing of the lateral wires that support the shield 31 and the wire bail 27, so that installation is as simple as possible. Likewise, the lateral spacing of the tabs 32 with respect to the vertical wires of the cage wall is not critical to the installation or function of the shield.

We claim:

1. An animal watering bottle assembly having an inverted bottle and a delivery tube extending from the lower end and a bail for securing the assembly to the exterior of a wire cage wall, a shield for protecting the animal watering bottle assembly from gnawing and biting by an animal within the cage, said shield including:
   a generally planar web having length and width dimensions similar to said animal water bottle assembly;
   hook means extending from an upper edge portion of said web for suspending said shield from a lateral wire of the animal cage;
   a hole disposed in a lower portion of said web for permitting the water delivery tube to extend through said shield into the cage, said water delivery tube bearing on said hole to support the weight of said bottle and the water within said bottle.

2. The animal watering bottle assembly of claim 1, wherein said bail extends about said bottle and said planar web, said bail including hook ends secured to a lateral wire of the cage wall, said hook ends disposed adjacent to respective opposed side edges of said web.

* * * * *